3,188,225
METHOD OF PRODUCING CARBON-SILICATE COMPLEXES

George Forbes Walker, Blackburn, Victoria, Australia, assignor to Commonwealth Scientific and Industrial Research Organization, East Melbourne, Victoria, Australia, a body corporate of Australia
No Drawing. Filed Feb. 19, 1962, Ser. No. 174,254
Claims priority, application Australia, Feb. 22, 1961, 1,739/61
8 Claims. (Cl. 106—291)

This invention relates to new carbon-silicate complexes and methods for their production.

According to this invention, a carbon-silicate complex is produced by heating an expanding lattice layer silicate such as a member of the vermiculite or montmorillonite groups or a hydrated halloysite with glycerol or a glyceride to a temperature and for a time sufficient to form a complex having a "sandwich structure" in which one or more layers of the organic substance is or are intercalated between adjacent silicate layers, and decompose the intercalated organic substance in situ. This decomposition causes the complex to become darker due to the presence of free carbon. Preferably the material is heated at least to the boiling point of the glycerol or glyceride, which in the case of glycerol is 290° C. The last part of the heating at least is advantageously effected in an atmosphere of nitrogen or other inert gas to minimise oxidation of the carbon in the complex.

The preferred complexes are produced from glycerol and montmorillonite.

Pretreatment of the materials used to form the complex with a strong dehydrating agent such as concentrated sulphuric acid before the heat treatment leads to an increase in the carbon content of the final product.

The invention also includes complex materials having a "sandwich structure" in which carbon layers derived from the decomposition of glycerol or glycerides are intercalated between the silicate layers in expanding lattice layer silicate materials.

The new products of the invention have novel properties which render them suitable as improved substitutes for carbon black for certain purposes. As an example, the complexes prove useful as extenders in printing-inks, having the advantage over the normally used carbon black of reducing or eliminating the "mist" normally produced by high-speed printing presses. The observed ability of the complexes to disperse readily in water or in organic liquids including oils also suggests that the complexes will be useful in other applications which require this concomitant hydrophilic-organophilic character.

The carbon-montmorillonite complexes have been found experimentally to be extremely effective in xerographic printing processes, where their peculiar electrostatic charge characteristics allow the complexes to be used for black printing with considerable advantage over carbon blacks.

The method of the invention is applicable to material ranging from clay-size particles (for example, material having an equivalent spherical diameter of less than $2\mu$) up to macroscopic crystals.

Studies of the mechanism of formation of the carbon complexes have shown that decompositon of the organic material occurs only when a single layer of this material is present between pairs of silicate layers. In vermiculites and hydrated halloysites, one layer of glycerol is normally taken up between each pair of silicate layers, and it is only necessary to boil these minerals in glycerol (290° C.) for a few minutes for intense blackening to develop. With montmorillonites, on the other hand, two layers of glycerol are normally taken up between pairs of silicate layers, and decomposition does not occur until the glycerol content has been reduced by evaporation till single layers of glycerol are present. The carbon-montmorillonite complex is therefore produced by adding glycerol to montmorillonite until the glycerol is taken up and intimately mixed with the montmorillonite and then heating the glycerol-montmorillonite complex to a temperature above the boiling point of glycerol (i.e. in excess of 290° C.). The excess glycerol is thereby caused to dry out until no more glycerol is present than is necessary to form single layers intercalated with the silicate, at which stage blackening develops.

The type of montmorillonite used was found to have a marked effect on the degree of blackening produced. In particular, the well-known Wyoming bentonite gave only a greyish product. Investigation showed that this was due to the type of interlayer cation in the minerals (Wyoming bentonite is a Na-montmorillonite) and that the relative efficiency of the cations in producing blackening is in the order Al=H=Mg>Ca=Sr=Ba>Na>K. Pretreatment of the montmorillonite with Al, H or Mg ions, therefore, markedly increases the colour intensity of the resultant carbon complex. However, if a montmorillonite is chosen which in its natural condition is saturated with one or more of these cations (viz. Al, H, Mg), no pretreatment is necessary.

In the blackest complexes formed, the carbon content approximates 20 percent by weight, and repeated treatment with glycerol plus heating does not increase the carbon content beyond this value.

It may be mentioned that a very large number of organic substances can be complexed with expanding lattice layer silicates to form complexes which darken when subjected to heat treatment. However, glycerol and glycerides are substances which are particularly effective in producing very black complexes containing a relatively high content of carbon, and these are the only organic substances which fall within the scope of the invention. If, for example, ethylene glycol is used in place of glycerol or a glyceride, a carbon-silicate complex is formed which has a dark brownish colour and contains less carbon than the corresponding glycerol complex.

The following examples further illustrate the invention.

Example 1

One part by weight of glycerol was added to one part by weight of air-dry montmorillonite powder and the resulting material was wedged by hand until thorough mixing was achieved and a stiff plastic mass was obtained. Sufficient concentrated sulphuric acid was added to make a thin slurry, and the slurry was heated for six hours at 105° C. During this heating, evaporation occurred and the material reverted to a stiff plastic mass and became appreciably darker in colour.

The mass was then heated in a nitrogen atmosphere to 800° C., the temperature being raised to this value over a period of two hours and maintained at this value for half an hour.

After cooling, the product, which formed a very black friable mass, was washed by decantation with water five times to remove soluble salts, and was then dried and pulverised to form a fine black powder ready for use. Analysis of products made by this procedure showed a carbon content of 15–20 percent by weight.

Example 2

The procedure described in Example 1 was repeated except that the treatment with sulphuric acid and heating of the slurry were omitted. A fine black powder was obtained with a carbon content of 10–15 percent by weight.

Example 3

A quantity of hydrated halloysite was immersed at room temperature for 20 minutes in sufficient glycerol to cover the mineral completely. The mixture was then raised to the boiling point and gently boiled for half an hour, during which time the halloysite particles developed an intense black colour. After cooling, the product was washed with water several times, dried and pulverised.

I claim:

1. A method of producing a carbon-silicate complex, which comprises mixing an expanding lattice layer silicate selected from the group consisting of vermiculites, montmorillonites and hydrated halloysites, with glycerol; and heating the resulting mixture of the silicate and glycerol in a non-oxidizing medium to a temperature at least equal to the boiling point of glycerol and for a time sufficient to form a complex having a "sandwich structure," in which at least one layer of the glycerol is intercalated between adjacent silicate layers, and to decompose the intercalated glycerol in situ.

2. The method as in claim 1; wherein said silicate is a montmorillonite saturated with aluminum cations.

3. The method as in claim 1; wherein said silicate is a montmorillonite saturated with hydrogen cations.

4. The method as in claim 1; wherein said silicate is a montmorillonite saturated with magnesium cations.

5. The method as in claim 1; wherein said non-oxidizing medium is an inert gas.

6. The method as in claim 1; wherein said non-oxidizing medium consists of an excess of said glycerol in which said silicate is completely submerged during said heating thereof.

7. The method as in claim 1; further comprising mixing a strong dehydrating agent with said silicate and glycerol before said heating.

8. The method as in claim 1; wherein said heating is continued until a dry product is obtained; and further comprising the step of pulverizing said dry product.

References Cited by the Examiner
UNITED STATES PATENTS

| | | | |
|---|---|---|---|
| 1,424,729 | 8/22 | Lamb | 106—307 |
| 3,107,173 | 10/63 | Klenke | 106—307 |

TOBIAS E. LEVOW, *Primary Examiner.*